Figure 1:
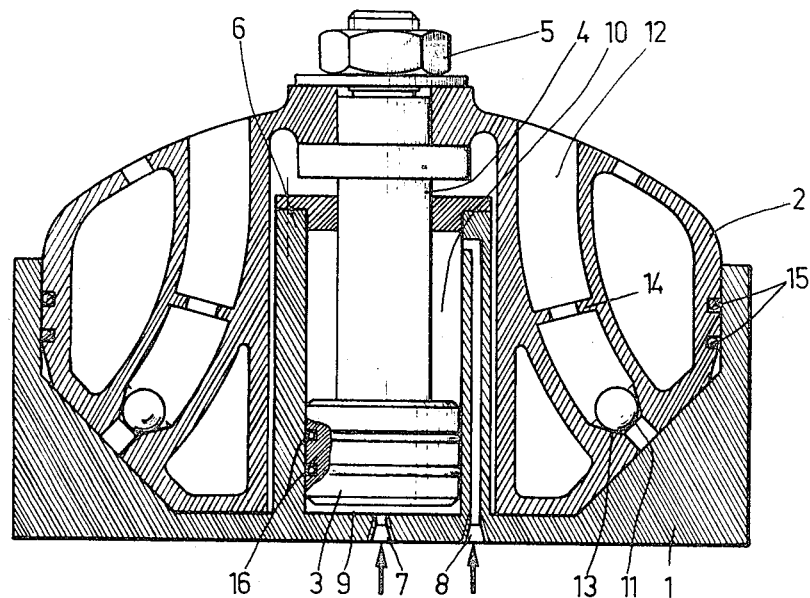

United States Patent
Cholet

[11] 3,833,087
[45] Sept. 3, 1974

[54] DEVICE FOR GENERATING ACOUSTIC WAVES BY IMPLOSION

[75] Inventor: Jacques Cholet, Rueil-Malmaison, France

[73] Assignee: Institut Francais du Petrole, des Carburants et Lubrifiants, Rueil-Malmaison (Hauts-de-Seine), France

[22] Filed: Jan. 11, 1972

[21] Appl. No.: 216,962

[30] Foreign Application Priority Data
Jan. 19, 1971 France .................. 71.1719

[52] U.S. Cl. ............... 181/.5 H, 137/533.11
[51] Int. Cl. .................................. G01v 1/02
[58] Field of Search ............ 181/.5 A, .5 H, .5 XC; 137/533.11

[56] References Cited
UNITED STATES PATENTS
3,444,953  5/1969  Cholet et al. ................. 181/.5 NC
3,610,275  10/1971  Determan ..................... 137/533.11
3,638,752  2/1972  Wakefield .................... 340/12 R
R26,748  12/1969  Schenycf ...................... 181/.5 H

*Primary Examiner*—Benjamin A. Borchelt
*Assistant Examiner*—J. V. Doramus
*Attorney, Agent, or Firm*—Craig & Antonelli

[57] ABSTRACT

Device for generating acoustic waves by implosion comprising two stationary cylinders, two pistons solid with each other and each slidably mounted each in a separate cylinder but with different strokes so that one piston can be placed, by acting on the other piston, in a position of disengagement from the closed portion of its cylinder. A sealing arrangement is provided for insulating the last-mentioned cylinder from the external medium as long as its piston is not disengaged from the closed portion thereof. Intermittent communication between said closed portion of the cylinder and the external medium is established when the piston is displaced in said closed portion towards the bottom thereof.

17 Claims, 5 Drawing Figures

DEVICE FOR GENERATING ACOUSTIC WAVES BY IMPLOSION

This invention relates to a device for generating acoustic waves by implosion, particularly adapted for operation in a water body as in marine seismic prospecting. This device is designed for being towed from the aft of a ship so as to perform a substantially continuous survey of a portion of the submerged ground.

The prior art in this field can be illustrated by an acoustic wave generator whose working principle consists of storing air under a very high pressure in an immersed convenient chamber and then abruptly releasing said compressed air to the surrounding water, thereby generating an acoustic wave. A device of this type has been described in U.S. Pat. No. 3,249,177.

In this type of device, the storage of air under a very high pressure requires the use of compressors of high cost. In addition, the power yield of such a device is unsatisfactory and the obtained pulsating signal is not convenient for use in seismic prospecting.

It is therefore an object of this invention to provide a generator of acoustic waves obtained by implosion and which may be produced at a high recurrence frequency, thereby making it possible to explore the underwater ground in a substantially continuous manner without any distance limitation and under high safety conditions, since the transportation of explosive loads is avoided.

Besides, the power yield of the instant invention is excellent and the obtained signal is not pulsating and has a sharp shape, particularly convenient for use in seismic prospecting.

Additional advantages of the instant invention are its simple way of operation and its low cost.

The device according to the invention, when immersed, produces implosions as a result of the negative pressure created by the motion of a sliding piston towards the open end of a cylinder the interior of which is insulated from the external medium by sealing means. When the piston is disengaged from the closed portion of the cylinder, the surrounding water abruptly fills up the free space of the cylinder, thereby producing an implosion which generates an acoustic wave.

The instant invention includes means for establishing intermittently a communication between the interior of the cylinder and the external medium.

The device according to the invention will be further described more in detail with reference to the accompanying drawings wherein:

FIG. 1 diagrammatically shows a partial cross-sectional view of a first embodiment of the invention in a position of engagement of the piston in the closed portion of the cylinder.

Figure 2:
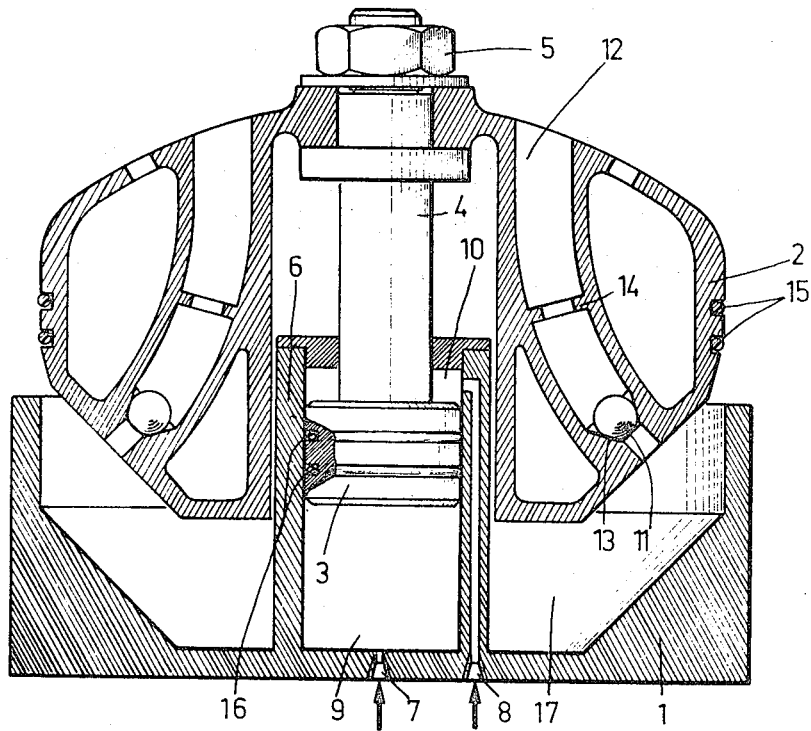

FIG. 2 diagrammatically shows a cross-sectional view of said first embodiment in a position where the piston is disengaged from the closed portion of the cylinder.

Figure 3:
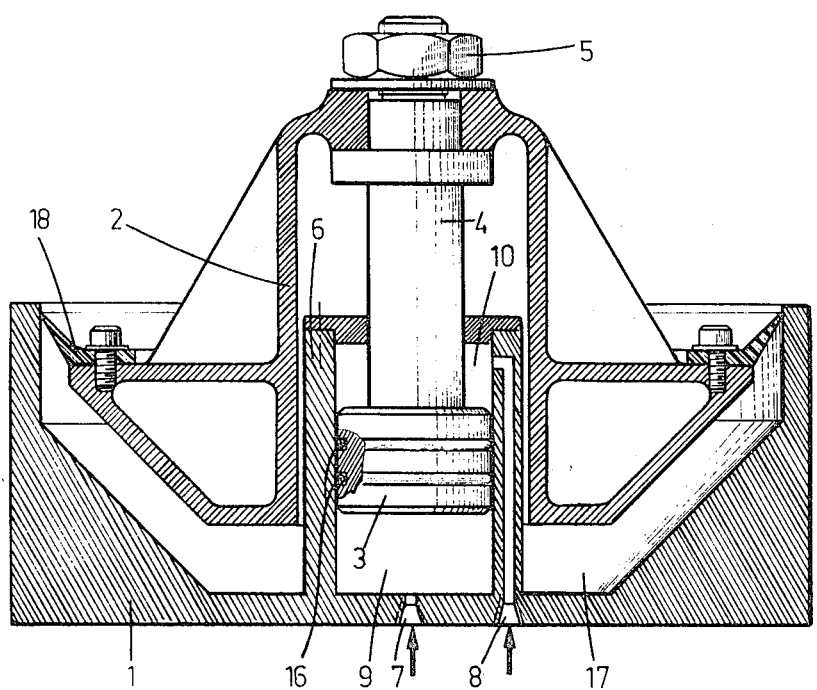

FIG. 3 diagrammatically shows a cross section of a second embodiment of the invention.

Figure 4:
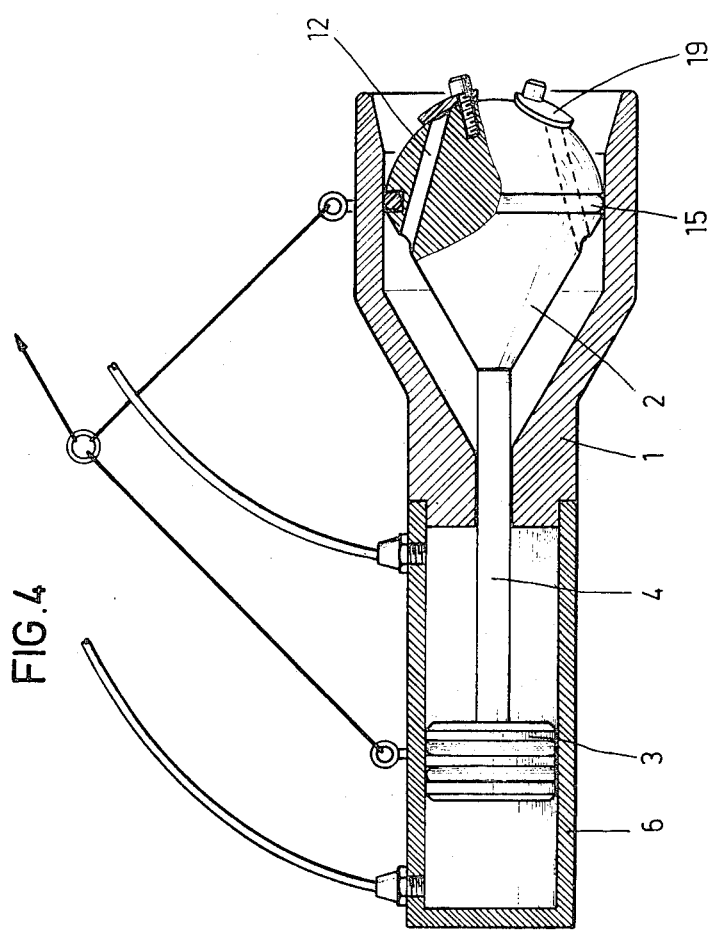
Figure 5:
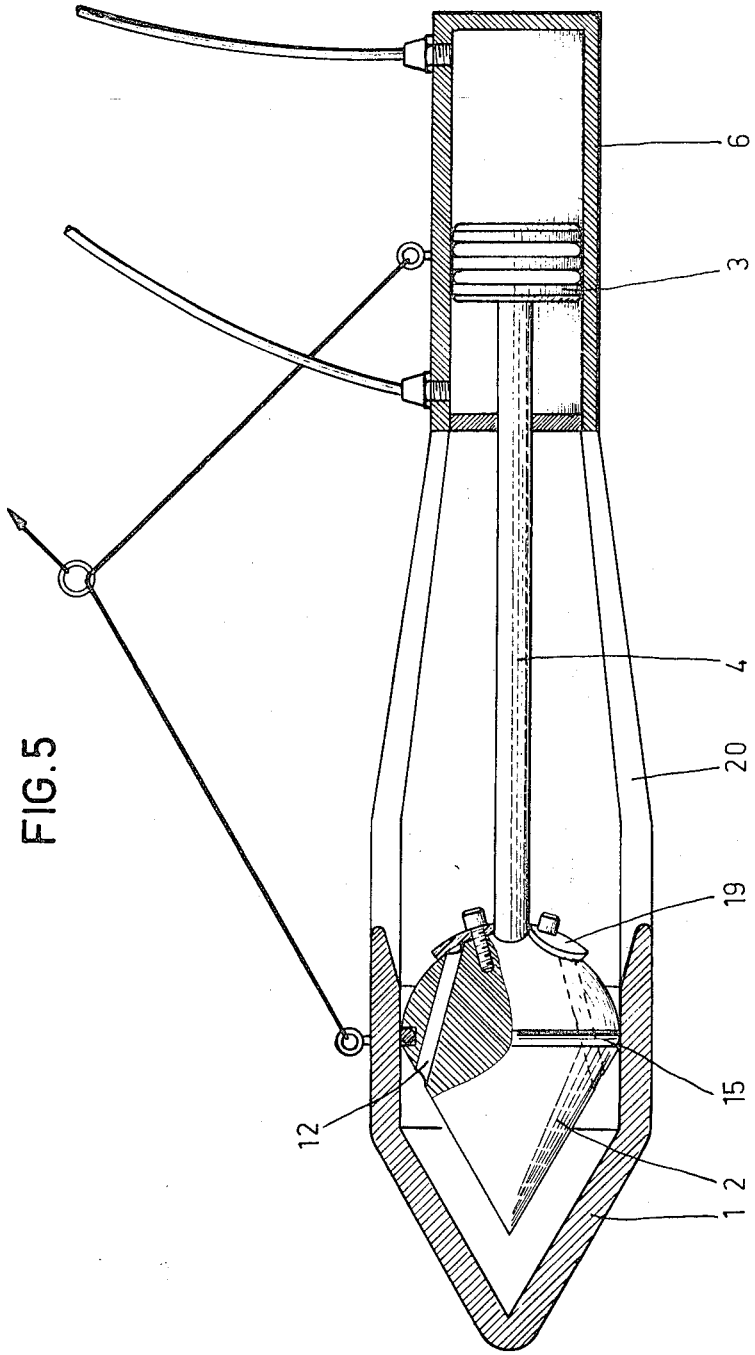

FIG. 4 is a diagrammatic cross-sectional view of a third embodiment of the invention, and FIG. 5 diagrammatically shows a cross-section of a fourth embodiment of the invention.

The embodiment shown in FIG. 1 comprises a first cylinder 1 in which a first piston 2 is slidably mounted. This piston is moved by acting on a second piston 3, the rod 4 of which is made solid with piston 2 through fastening means 5. The piston 3 slides in a second cylinder 6 solid with the first cylinder. The piston 3 is displaced in the cylinder 6 by means of a hydraulic system, for example comprising inlet ducts 7 and 8 for conveying fluid respectively to chambers 9 and 10 on both sides of piston 3.

The piston 2 is provided with valves for example ball shut off valves 11 for obturation of ducts 12 arranged in the piston body. The stroke of the balls of the valves in the ducts is limited on one side by a shoulder 13 provided at the end of the duct close to the bottom of cylinder 1 and on the other side by stop members 14 arranged in the duct.

The piston 2 is provided with sealing members 15 insuring a good sealing between piston 2 and cylinder 1. The cylinder 1 and the piston 2 may be of circular cross-section and the sealing members 15 may consist of O-rings of elastic material.

The piston 3 is provided with sealing joints 16.

The piston 2, made of a strong material, may be rather thick and lightened by the provision of inner recesses in the thick portions of its body.

The stroke of piston 3 inside the cylinder 6 is longer than the stroke of piston 2 inside the cylinder 1.

The invention works as follows: The piston 3 being at the bottom of cylinder 6, which corresponds to a position of piston 2 at the bottom of cylinder 1, a fluid (e.g, water, oil or air) is discharged into chamber 9 through duct 7. The piston 3 moves, in the cylinder 6, away from the bottom thereof and drives, by means of the rod 4, the piston 2 which moves away from the bottom of cylinder 1. The ducts 12 being in communication with the external medium, the water pressure urges the balls of valves 11 against the shoulders 13, thereby obturating said ducts. Accordingly the displacement of the piston 2 in cylinder 1, in a water-proof manner, generates a vacuum space 17 therein.

Since the stroke of piston 3 inside cylinder 6 is greater than the stroke of piston 2 inside cylinder 1, the piston 2 is disengaged from the closed portion of cylinder 1 as shown in FIG. 2. Immediately upon disengagement of the piston 2 from the cylinder 1, the external water rushes into the space 17 where vacuum was previously created and the resulting implosion generates an acoustic wave.

After said implosion, fluid is discharged into the chamber 10 of cylinder 6. The piston 3 comes back towards the bottom of cylinder 6, driving therewith the piston 2 towards the bottom of cylinder 1. The balls of the valves move away from the shoulders 13, thus releasing the ports of ducts 12 for communication with cylinder 1. The water contained in the space 17 is then discharged to the external medium through the ducts 12.

According to the embodiment shown in FIGS. 1 and 2, the second cylinder 6 is internal to the first cylinder 1 and arranged concentric therewith.

According to a second embodiment of the device, shown in FIG. 3, the sealing between piston 2 and cylinder 1 is achieved by means of a lip type joint 18 fastened to the circumference of piston 2. This joint is deformable in only one direction. It acts as a check valve by giving passage to the water contained in the space 17 of the first cylinder when the piston 2 moves towards the bottom of said cylinder and by maintaining this space sealed off from the external water when the piston 2 moves away from the bottom of cylinder 1.

In this case the intermittent passageway between the interior of the cylinder and the liquid external medium consists of the annular space between cylinder 1 and piston 2.

In the third embodiment illustrated by FIG. 4, the second cylinder 6 is not internal to the cylinder 1 but adjacent and extending in an opposite direction, both cylinders being solid with each other and having a common bottom part through which slides the rod 4 connecting piston 3 to piston 2.

The piston 2 and the cylinder 1 have a shape so designed as to favor an abrupt rush of the water into the cylinder. The piston 2 comprises discharge ducts, intermittently closed by check valves formed by plates 19 of deformable material, one end of which is fastened to the piston 2.

According to a fourth embodiment of the device, illustrated in FIG. 5, the cylinder 6, containing piston 3 extends in a direction opposite to cylinder 1, from the side of the opening thereof. Both pistons are made solid with each other through connecting parts 20. The piston 3 is connected to piston 2 through rod 4.

Each one of these devices is adapted to be towed behind a ship for a substantially continuous operation. In order to facilitate the penetration of water into the cylinder 1 it is convenient to place the opening of this cylinder along the direction of the ship heading.

From the foregoing description, one skilled in the art can easily ascertain the essential characteristics of the invention and, without departing from the spirit and scope thereof, can make various changes and modifications of the invention to adapt it to various usages and conditions.

Consequently, such changes and modifications are properly, equitably and intended to be within the full range of equivalence of the appended claims.

What I claim is:

1. A device for generating acoustic waves by implosion comprising: a first cylinder open at one end thereof and closed at the other end thereof, a first piston slidably mounted in said first cylinder, means for moving said first piston with respect to said first cylinder over a stroke longer than said first cylinder, sealing means provided on said first piston for insulating the cylinder portion between the closed end thereof and said first piston from an external medium during at least a stage of displacement of said first piston towards said open end of said first cylinder and means including a valve means provided in said first piston for establishing intermittent communication between the external medium and the interior of the first cylinder.

2. A device according to claim 1, wherein said means for establishing intermittent communication between the external medium and the interior of the first cylinder further includes at least one passageway provided through the body of said first piston, and wherein said valve means is a shut off valve provided in said passageway.

3. A device according to claim 2, wherein said shut off valve consists of a free ball in said passageway, and wherein stop members are provided in said passageway for said ball.

4. A device according to claim 1, wherein said means for establishing intermittent communication between the external medium and the interior of the first cylinder further include at least one duct arranged through the body of the first piston and provided with ports for communication between said external medium and the interior of said first cylinder, and wherein said valve means is a shut off valve disposed in said duct.

5. A device according to claim 1, wherein said sealing means includes at least one seal for obturating an annular passageway between said first cylinder and said first piston during the stage of displacement of the latter towards said open end of said first cylinder.

6. A device according to claim 1, wherein said sealing means consist of a seal of the lip type placed on the circumference of said first piston.

7. A device according to claim 1, wherein the means for moving said first piston with respect to said first cylinder comprises a second piston operatively connected with said first piston and slidably mounted in a second cylinder housed concentrically in said first cylinder.

8. A device according to claim 1, wherein the means for moving said first piston with respect to said first cylinder comprises a second piston operatively connected with said first piston and slidable in a second cylinder, extending from the open end of the first cylinder, in a direction opposite to that of said first cylinder.

9. A device according to claim 1, wherein said sealing means consists of at least one seal of the lip type said seal having a first portion affixed at the circumference of said first piston and a second portion disposed at an angle to said first portion, the free end of said second portion engaging said first cylinder whereby said lip type seal is deformable substantially in only one direction.

10. An acoustic wave generating device comprising: a cylinder provided with an open and closed end; a piston disposed in said cylinder; means for displacing said piston toward said closed end of said cylinder and out of said open end of said cylinder to allow an external medium to enter said cylinder; and sealing means provided on said piston for sealing said cylinder from the external medium during at least a portion of the displacement of said piston toward said open end of said cylinder including valve means in said piston for discharging the external medium from said cylinder upon the displacement of said piston toward said closed end of said cylinder.

11. An acoustic wave generating device according to claim 10 wherein said sealing means further includes at least one passageway provided in said piston and a check valve disposed at one end of said passageway.

12. An acoustic wave generating device according to claim 11 wherein said check valve includes a ball member disposed in said passageway, said passageway being provided with means for limiting the displacement of said ball member.

13. An acoustic wave generating device according to claim 11 wherein said check valve includes a plate member of deformable material disposed over the end of said passageway.

14. An acoustic wave generating device according to claim 11 wherein said sealing means further includes at least one annular ring member disposed on the circumference of said piston engaging an inner surface of said cylinder.

15. An acoustic wave generating device according to claim 10 wherein said sealing means includes at least one annular deformable lip disposed on the circumference of said piston engaging an inner surface of said cylinder.

16. An acoustic wave generating device according to claim 10 wherein said means for displacing said piston in said cylinder includes a second cylinder concentrically disposed in the first mentioned cylinder and a second piston disposed in said second cylinder operatively connected to the first mentioned piston.

17. An acoustic wave generating device according to claim 10 wherein said means for displacing said piston in said cylinder includes a second cylinder diametrically disposed from the first mentioned cylinder and a second piston disposed in said second cylinder operatively connected to the first mentioned piston.

* * * * *